United States Patent [19]

Yamanaka

[11] Patent Number: 4,893,065

[45] Date of Patent: Jan. 9, 1990

[54] GEOMETRIC ERROR COMPENSATION CIRCUIT OF COLOR TELEVISION CAMERA DEVICES

[75] Inventor: Junichi Yamanaka, Sagamihara, Japan

[73] Assignee: Tokyo Shibaura Denki Kabushiki Kaisha, Kanagawa, Japan

[21] Appl. No.: 96,788

[22] Filed: Sep. 16, 1987

Related U.S. Application Data

[63] Continuation of Ser. No. 580,163, Feb. 14, 1984, abandoned.

[30] Foreign Application Priority Data

Feb. 17, 1983 [JP] Japan .................................. 58-23722

[51] Int. Cl.$^4$ ............................................. H01J 29/56
[52] U.S. Cl. ..................................... 315/371; 315/370
[58] Field of Search ................................ 315/370, 371

[56] References Cited

U.S. PATENT DOCUMENTS 4,337,419 6/1982 Holzgrafe ........................... 315/371

OTHER PUBLICATIONS

Japanese Patent Laid-open 57-11588 Inventors: Noma, Yoshimura Filed: Jun. 25, 1980.

Primary Examiner—Thomas H. Tarcza
Assistant Examiner—Gregory C. Issing
Attorney, Agent, or Firm—Finnegan, Henderson, Farabow, Garrett and Dunner

[57] ABSTRACT

For the purpose of compensating for geometric errors at four corners of a color picture there are provided a circuit for separating a vertical scanning saw tooth shaped signal into first and second signals corresponding to fore and rear portions of a vertical scanning period, first and second balanced modulators respectively modulating a horizontal scanning saw tooth shaped signal in accordance with the separate first and second signals, circuits for separating the outputs of the modulators in accordance with their reference levels, and circuits for generating geometric error compensation outputs corresponding to specific portions in the horizontal and vertical directions of the scanned picture.

7 Claims, 6 Drawing Sheets (e)

(f)

(g)

(h)

(i)

(j)

(k)

(l)

(m)

(n)

(o)

(p)

GEOMETRIC ERROR COMPENSATION CIRCUIT OF COLOR TELEVISION CAMERA DEVICES

This application is a continuation of application Ser. No. 580,163, filed Feb. 14, 1984 abandoned 3/14/88.

BACKGROUND OF THE INVENTION

1. Field of the Invention

This invention relates to a television camera device utilizing an image pick-up tube; and more particularly, to a geometric error compensating circuit which compensates for geometric errors at four corners of a scanned picture surface.

2. Description of the Prior Art

In a color television camera a plurality of image pick-up tubes (hereinafter called a multitube type color camera), are utilized to obtain images of high quality registration. Adjustment for preventing registration error caused by the difference in the characteristics of respective image pick-up tubes, their deflection coils and deflection circuits is known. Such adjustment has been made by adjusting the position, amplitude and linearity of the electron beams of respective image pick-up tubes. In recent years, for the purpose of further improving the accuracy, it has been requested to compensate for registration error caused by geometric error at specific portions of the four corners of a scanned picture surface.

As will be described later in more detail, the scanned picture surface is divided into four regions; and in each region, electron beam scanning is compensated for in orthogonal directions at each corner. Since compensations of respective regions must be done independently it is necessary to compensate for the deflection waveform at 8 portions of the scanned picture surface.

One example of such compensation circuit is disclosed in Japanese Laid Open Patent Specification No. 11588/1982. In the compensation circuit disclosed therein 8 modulators are used for compensating for geometric errors at the four corners so as to independently produce compensation waveform signals for 8 portions. However, respective modulators of this compensation circuit should be balanced modulators, and all modulators must maintain their balanced state. Use of such a number of modulators not only makes it impossible to miniaturize the multitube type color camera; but also prevents saving of electric power. Moreover, since a signal (comparator output), which is obtained by slicing a saw tooth shaped signal, is inputted to each modulator, the drift of this input signal varies the balanced state of the modulator, so that adjustment of the balance is troublesome.

As a consequence, in a compensation circuit utilizing a number of modulators there are such problems as instability, complicated maintenance, large size and increase in power consumption.

SUMMARY OF THE INVENTION

Accordingly, it is an object of this invention to provide an improved geometric error compensation circuit of a television camera device, which has a simple construction, but can effectively compensate for the geometric errors at specific portions of the four corners of a scanned picture surface.

According to this invention, there is provided a geometric error compensation circuit of a color television camera device comprising a first separating circuit separating a vertical scanning saw tooth shaped signal into a first signal and a second signal respectively corresponding to fore and rear portions of a vertical scanning period; first and second balanced modulation circuits, effecting balanced modulations of a horizontal scanning saw tooth shaped signal in accordance with the separated first and second signals respectively; second and third separating circuits for separating outputs of the respective first and second balanced modulation circuits into third and fourth signals, and fifth and sixth signals respectively in accordance with reference levels of said outputs; and compensation signal forming circuits forming geometric error compensation signals corresponding to specific portions of the horizontal and vertical periods, in accordance with the separated fourth and sixth signals.

Since two balanced modulators are used, not only can the balanced states of these modulators facilitated, but also the construction can be made simple.

BRIEF DESCRIPTIONS OF THE DRAWINGS

DESCRIPTION OF THE PREFERRED EMBODIMENTS

Figure 1:
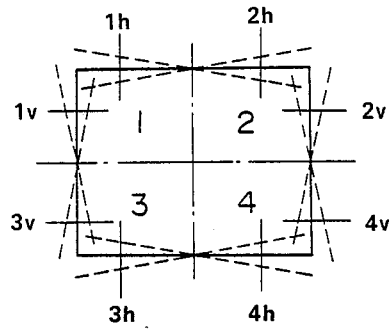
FIG. 1 is a diagrammatic representation of a prior art method of compensating for the geometric errors at four corners of a scanned picture.

As shown in FIG. 1, according to a prior art method of compensating for the geometric errors at specific portions of the four corners of a rectangular scanned surface is divided into four regions 1 through 4. Describing region 1, electron beam scanning is compensated for in two orthogonal directions $1h$ and $1v$ at the left upper corner. In other regions 2, 3 and 4, the electron beam scanning is corrected in orthogonal directions $2h$, $2v$; $3h$, $3v$, and $4h$, $4v$ at the right upper, left lower and right lower corners. This method, and prior art compensation circuit, however, accompany various problems as above described.

Figure 2:
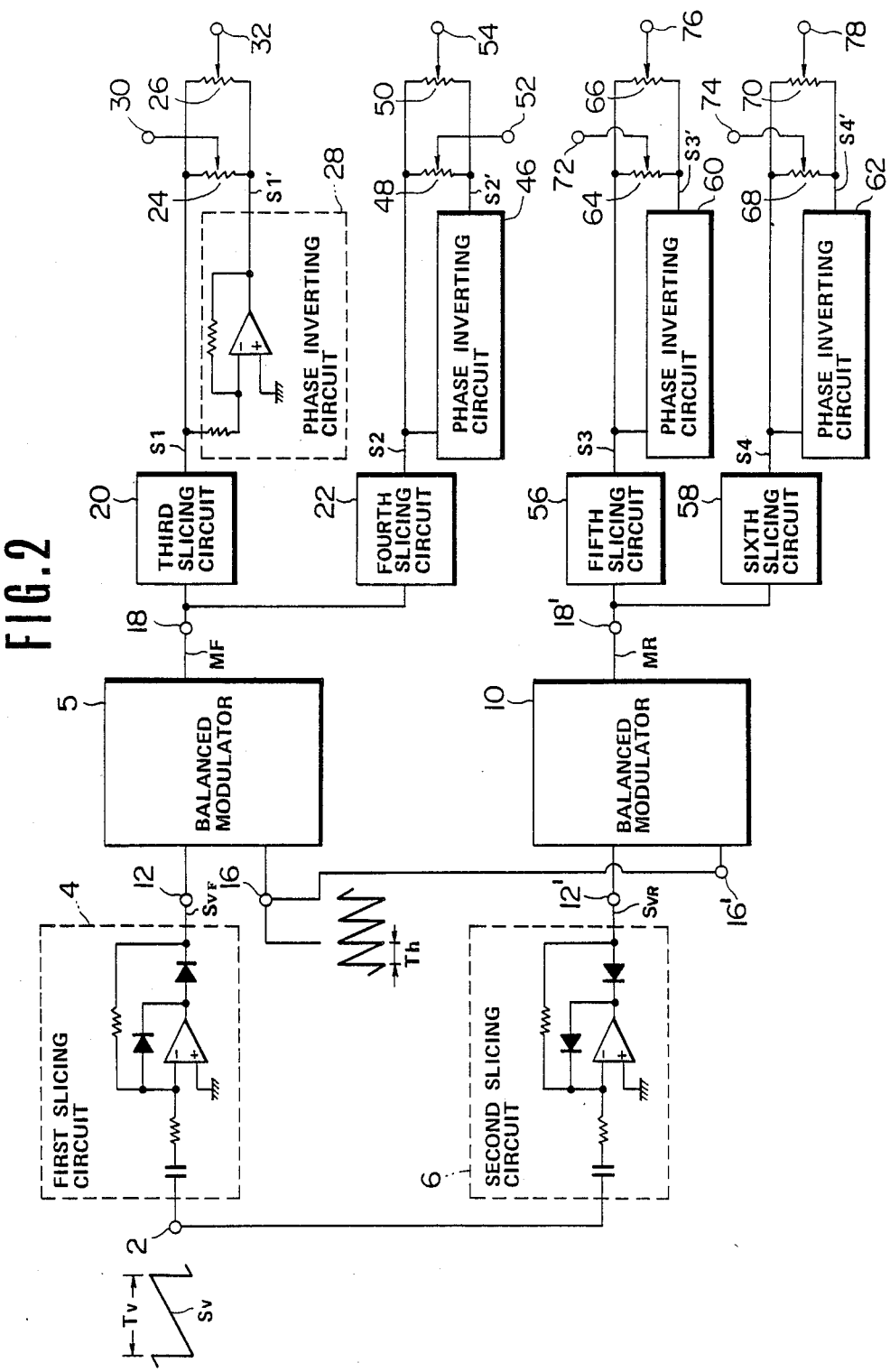
FIG. 2 is a connection diagram showing one embodiment of the geometric error compensation circuit according to this invention.
Figure 3:
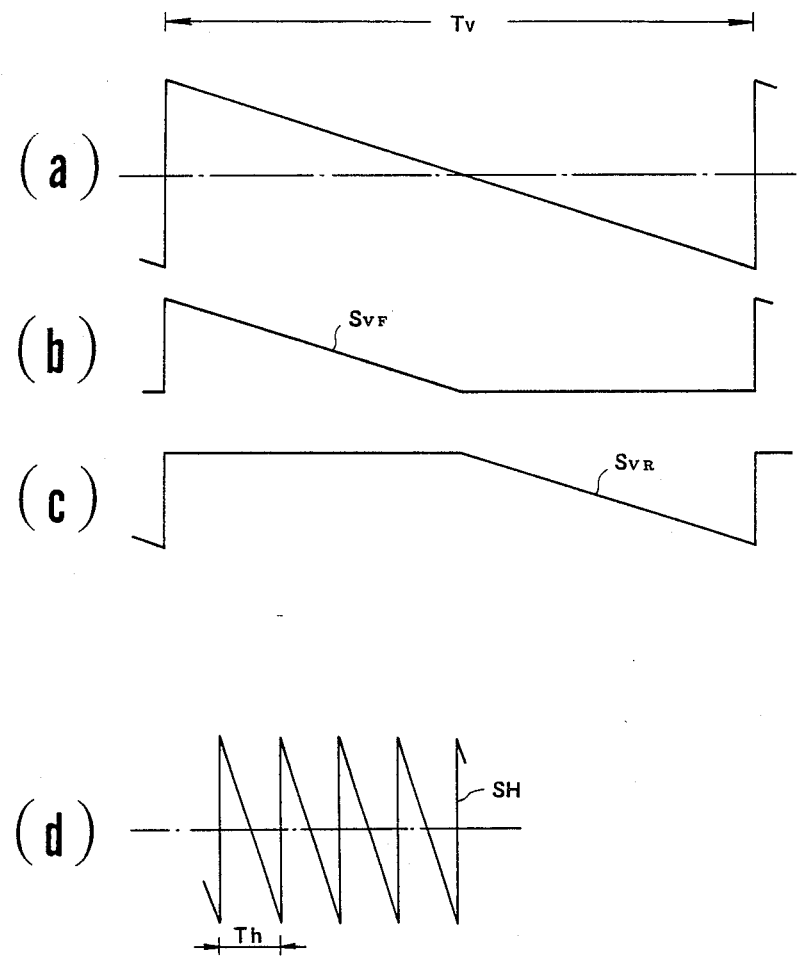
FIGS. 3a through 3p are signal waveforms useful to explain the operation of the circuit shown in FIG. 2.
Figure 3:
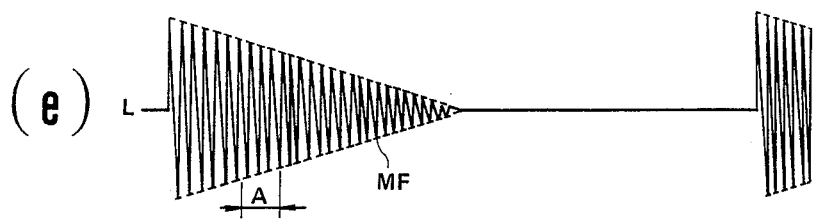
Figure 3:
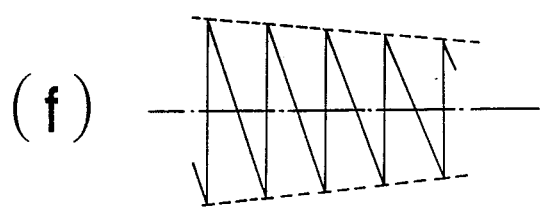
Figure 3:
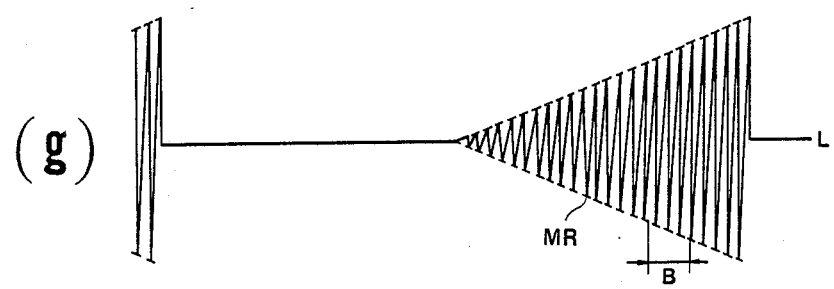
Figure 3:
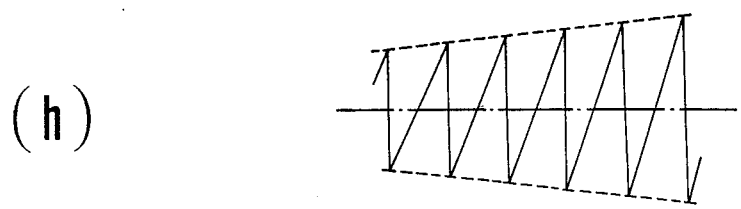
Figure 3:
Figure 3:
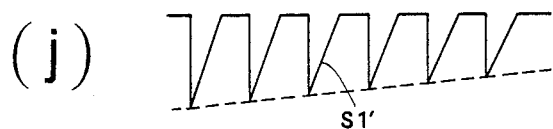
Figure 3:
Figure 3:
Figure 3:
Figure 3:
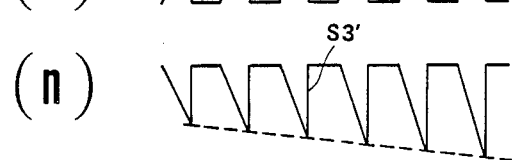
Figure 3:
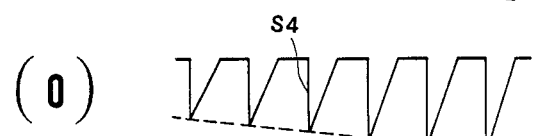
Figure 3:
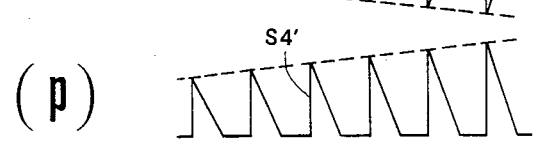

In the improved compensation circuit of this invention shown in FIG. 2, a vertical scanning saw tooth wave signal SV having a vertical scanning period Tv is inputted to an input terminal from a vertical deflection circuit, not shown. This signal SV is inputted to first and second slicing circuits 4 and 6, each comprising a phase inverting circuit and a linear detection circuit as shown in the drawing. A positive waveform signal is output from the first slicing circuit 4, while a negative waveform signal is derived out from the second slicing circuit 6. The first slicing circuit 4 inverts the vertical scanning saw tooth waveform signal SV as shown in FIG. 3a so as to produce a positive fore half signal SVF as shown in FIG. 3b, while the second slicing circuit 6 produces the rear half signal SVR of the vertical scanning signal SV as shown in FIG. 3c. These fore half signal SVF and rear half signal SVR, respectively, correspond to the upper half of the picture corresponding to the fore half of the vertical scanning period TV and the lower half of the picture corresponding to the rear half of the vertical scanning period.

The output signals SVF and SVR of the first and second slicing circuits 4 and 6 are supplied to input terminals 12 and 12' of first and second balancing modulators 5 and 10. A horizontal scanning saw tooth waveform signal SH shown in FIG. 3d and generated by a horizontal deflection circuit, not shown, and having a period Th as shown in FIG. 3d is applied to other terminals 16 and 16' of the modulators 5 and 10. The upper half of the horizontal scanning saw tooth waveform signal SH corresponds to the left side of the horizontal scanning while the lower half corresponds to the right side.

Figure 4:
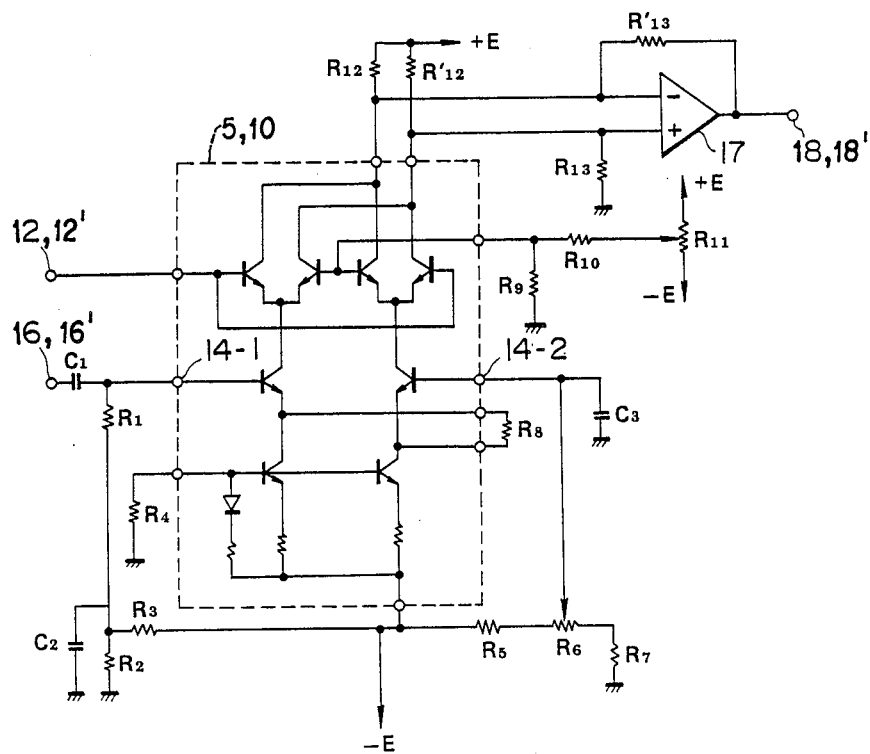
FIG. 4 is a connection diagram showing the balanced modulator shown in FIG. 2.

The first and second balanced modulators 5 and 10 have the same construction as shown in FIG. 4. Circuit elements enclosed by dash lines in FIG. 4 constitute one of the balanced modulator 5,10 which can be constructed, for example, by an integrated circuit MC1496 manufactured by Motorola Inc., U.S.A.

In FIG. 4, reference numerals 12, 12' designates an input terminal of a modulation signal, and 16, 16' an the input terminal of a signal to be modulated. Resistors $R_2$, $R_3$, $R_5$, $R_6$ and $R_7$ are bias resistors connected to the input terminals 16, 16', while resistors $R_9$, $R_{10}$ and $R_{11}$ are provided for adjusting the balanced state. By setting $R_{12}=R_{12}'$ and $R_{13}=R_{13}'$, the output terminal of an operational amplifier 17, that is output terminal 18, 18' of the modulator becomes a zero bias state.

In this modulator, when the fore half signal SVF shown in FIG. 3b is applied to input terminal 12, 12', the horizontal scanning saw tooth waveform signal SH shown by FIG. 3d is applied to the input terminal, 16, 16', a balanced state is set by resistor $R_{11}$, and when the DC biases applied to the input terminals 14-1 and 14-2 of the modulator 5,10 are made to be equal, a modulated output signal MF as shown in FIG. 3e can be obtained at the output terminal 18, 18', in which the envelope of a period in which the signal to be modulated does not contain any DC component, is symmetrical with respect to the center or zero line L. When the rear half signal SVR shown in FIG. 3c is applied to the input terminal 12, 12' which receives modulation signal, a modulated output signal MR as shown in FIG. 3g would appear at the output terminal 18, 18'.

FIG. 3f is an enlarged view showing the waveform in a period A shown in FIG. 3e, and FIG. 3h is an enlarged view showing the waveform in a period B shown in FIG. 3g.

The output of the first balanced modulator 5 having a construction as above described is applied to the third and fourth slicing circuits 20 and 22 shown in FIG. 2. The third slicing circuit 20 provides a positive output with reference to a reference level L from the output shown in FIG. 3e of the modulator 5, whereas the fourth slicing circuit 22 provides a negative output. As a consequence, a compensation signal S1 shown in FIG. 3i is output from the third slicing circuit 20 and a compensation signal S2 shown in FIG. 3k is output from the fourth slicing circuit 22, the signal S1 corresponds to the fore half of the horizontal period Th in the fore half of the vertical period, and signal S2 corresponding to the rear half of the horizontal period Th in the fore half of the vertical period Tv.

Figure 5:
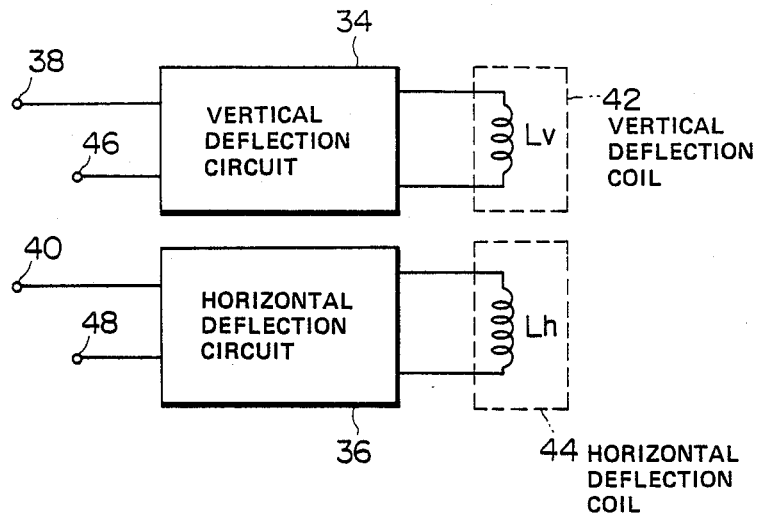
FIG. 5 is a connection diagram showing a vertical deflection circuit and a horizontal deflection circuit which are supplied with the outputs of the circuit shown in FIG. 2.

The compensation signal S1 is divided into two portions, one portion is applied to first and second level adjusters 24 and 26 in the form of variable resistors which are connected in parallel, while the other portion is applied to the other terminals of the level adjusters 24 and 26 via a phase inverting circuit 28, which produces a signal $S_1'$ shown in FIG. 3j so as to produce a composite signal of signals $S_1$ and $S_1'$ from level adjusters 24 and 26. The outputs of the first and second level adjusters 24 and 26 are applied to the respective control input terminals 38 and 40 of a vertical deflection circuit 34 and a horizontal deflection circuit 36, respectively, shown in FIG. 5. In the vertical deflection circuit 34, the waveform of the vertical scanning saw tooth shaped signal supplied to a vertical deflection coil 42 is compensated for. Also in the horizontal deflection circuit 36, the waveform of the horizontal scanning saw tooth shaped signal supplied to a horizontal deflection coil 44 is compensated for. In FIG. 5, reference numerals 46 and 48 designate deflection drive signal input terminals to which vertical and horizontal drive signals are supplied respectively.

Consequently, when signals S1 and S1' shown in FIGS. 3i and 3j are adjusted by the first level adjuster 24', and when its output is supplied to the vertical deflection circuit 34, the compensation is made in the direction of arrow 1h shown in FIG. 1. Further, a compensation is made in the direction of arrow 1v in accordance with the adjustment of the second level adjuster 26.

Signal S2 shown in FIG. 3k and produced by the fourth slicing circuit 22 is also divided and supplied to a phase inverting circuit similar to the phase inverting circuit 28 described above. Signal S2' shown in FIG. 3l and produced by the phase inverting circuit 46 and the output of the fourth slicing circuit 22 are applied across the third and fourth level adjusters 48 and 50 in the form of parallelly connected resistors. These level adjusters 48 and 50, which synthesize signals S2, have S2' and their outputs are respectively supplied to the control input terminals 38 and 40 of the vertical deflection circuit 34 and the horizontal deflection circuit 36 shown in FIG. 5. The vertical deflection circuit 34 compensates for the vertical scanning saw tooth shaped signal in accordance with a signal from the third level adjuster 48 while the horizontal deflection circuit 38 compensates for the horizontal scanning saw tooth shaped signal in accordance with a signal from the fourth level adjuster 50.

Consequently, when signals S2 and S2' shown in FIGS. 3k and 3l are adjusted by the third level adjuster, and since signals S2 and S2' have waveforms corresponding to the rear half of the horizontal period Th in the upper half of the picture, a compensation is made in the direction of arrow 2h shown in FIG. 1. Furthermore, a compensation is made in the direction of arrow 2v in accordance with the adjustment of the fourth level adjuster 50.

The output 18' of the second balanced modulator 10 is supplied to fifth and sixth slicing circuit 56 and 58 similarly constructed as the third and fourth slicing circuits 20 and 22. The fifth slicing circuit 56 provided a positive output from the output shown in FIG. 3g of the modulator 10 with reference to the reference level of the output, whereas a negative output is provided from the sixth slicing circuit 58. Accordingly the fifth slicing circuit 56 produces a signal S3 shown in FIG. 3m, whereas the sixth slicing circuit 58 produces a signal S4 shown in FIG. 3o. The signal S3 corresponds to the rear half of the horizontal period Th in the rear half of the vertical period, while the signal S4 corresponds to the fore half of the horizontal period Th in the rear half of the vertical period Tv.

Signals S3 and S4 from the fifth and sixth slicing circuits 56 and 58 are supplied to phase inverting circuits 60 and 62 similar to above described phase inverting circuit 28 to be converted into signals S3' and S4' shown in FIGS. 3n and 3p respectively. These signals S3' and S4', and the output signals of slicing circuits 56 and 58, are supplied across the fifth and sixth level adjusters 64 and 66, and the seventh and eighth level adjusters 68 and 70, each constituted by parallelly connected variable resistors. These level adjusters 64, 66, 68 and 70 synthesize signals S3 and S3', and signals S4, and S4' respectively. The output of the seventh level adjuster 68 is applied to the control input terminal 38 of the vertical deflection circuit 34 shown in FIG. 5 through the output terminal 74; and the output of the seventh level adjuster 68 is applied to the same control input terminal 38 through the output terminal 74, so as to compensate for the vertical scanning saw tooth shaped signal. The outputs of the sixth level adjuster 66 and the eighth level adjuster 70 are applied to the control input terminal of the horizontal deflection circuit 36 shown in FIG. 5 via output terminals 76 and 78, respectively for compensating for the horizontal scanning saw tooth shaped signal.

Thus, the compensation in the direction 4h shown in FIG. 1 is performed by the fifth level adjuster 64 which synthesizes signals S3 and S3', while the compensation in the direction 4v shown in FIG. 1 is performed by the sixth level adjuster 66. The seventh level adjuster 68 which synthesizes signals S4 and S4' performs a compensation in the direction of arrow 3h shown in FIG. 1, while the eighth level adjuster 70 performs a compensation in the direction of arrow 3v.

As above described, geometric errors at specific portions at four corners of the scanned picture shown in FIG. 1 can be compensated for in accordance with the adjustments of first to eighth level adjusters 24, 26, 48, 50, 64, 66, 68 and 70.

It should be understood that the invention is not limited to the specific embodiment described above. For example, although each of the level adjusters 24, 26, 48, 50, 64, 66, 68 and 70 was illustrated as a variable resistor, it is also possible to use a digital attenuator as each adjuster and to apply a computer control to the automatically controlled multitube type color camera so as to perform the level adjustment with a computer control.

Figure 6:
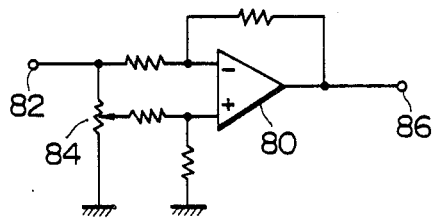
FIG. 6 is a connection diagram showing a modification of a portion of the circuit shown in FIG. 2.

Furthermore, instead of providing compensation signals by connecting phase inverting circuits and level adjusters to the output terminals of the third, fourth, fifth and sixth slicing circuits 20, 22, 56 and 58; it is also possible to connect a circuit shown in FIG. 6 to the output terminal of each slicing circuit to provide compensation signals. In FIG. 6, an operational amplifier 80 is used and outputs of respective slicing circuits 20, 22, 56 and 58 are supplied to one input terminal of the operational amplifier through an input terminal 82, while the outputs of respective slicing circuits are applied to the other input terminal of the operational amplifier via a level adjuster 84 in the form of a variable resistor, so as to obtain a compensation output at the output terminal 86. This compensation output can be made similar to the outputs of the level adjusters 24, 26, 48, 50, 64, 66, 68 and 70 by the adjuster 84.

What is claimed is:

1. A geometric error compensation circuit of a color television camera device having means for generating vertical and horizontal scanning sawtooth shaped signals during respective vertical and horizontal scanning periods, said compensation circuit comprising:

a first separating circuit for separating said vertical scanning signal into a first signal and a second signal corresponding to fore and rear portions respectively of the vertical scanning period;

first and second balanced modulator circuits for effecting balanced modulations of said horizontal scanning signal in accordance with the separated first and second signals, respectively, to provide an output signal for each said first and second modulator circuits, each said output signal having symetrical positive and negative portions;

second and third separating circuits for separating the output signals of said first and second balanced modulation circuits into third and fourth output signals, and fifth and sixth output signals, respectively, in accordance with reference levels of its respective said modulating circuit output signals; and compensation signal forming circuits for forming geometric error compensation signals corresponding to specific portions of said horizontal and vertical scanning periods in accordance with said separated third through sixth signals.

2. A geometric error compensation circuit according to claims 1 wherein said first separating circuit comprises two slicing circuits, each utilizing a predetermined reference level as a slicing level.

3. A geometric error compensation circuit according to claim 1 wherein said second and third separating circuits each comprise two slicing circuits, each said two slicing circuits utilizing reference levels of its respective said first and second balanced modulation circuits as slicing levels.

4. A geometric error compensation circuit according to claim 1 wherein said compensator signal forming circuits each comprise inverting circuits for inverting the separated signals from said second and third separating circuits, and synthesizing circuits for synthesizing corresponding outputs of said second and third separating circuits.

5. The geometric error compensation circuit according to claim 4 wherein each of said synthesizing circuit comprises a variable resistor.

6. A geometric error compensation circuit according to claim 1 wherein said compensation signal forming circuits, each comprise inverting circuits for inverting output signals of said second and third separating circuits, respectively, and means for adjusting said output signal levels including the inverted output signals of said second and third separating circuits.

7. A geometric error compensation circuit according to claim 1 wherein said specific portions comprise fore half and rear half portions of said horizontal and vertical scanning periods.

* * * * *